(12) United States Patent
Palenius et al.

(10) Patent No.: US 11,444,822 B2
(45) Date of Patent: *Sep. 13, 2022

(54) PROCEDURES TO CONTROL BEAMFORMING

(71) Applicant: Telefonaktiebolaget LM Ericsson (publ), Stockholm (SE)

(72) Inventors: Torgny Palenius, Barsebäck (SE); Robert Baldemair, Solna (SE); Martin Hessler, Linköping (SE); Eleftherios Karipidis, Stockholm (SE); Bo Lincoln, Lund (SE); Eliane Semaan, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 173 days.

This patent is subject to a terminal disclaimer.

(21) Appl. No.: 16/900,136

(22) Filed: Jun. 12, 2020

(65) Prior Publication Data

US 2020/0304362 A1    Sep. 24, 2020

Related U.S. Application Data

(63) Continuation of application No. 15/569,712, filed as application No. PCT/SE2017/050476 on May 11, (Continued)

(51) Int. Cl.
*H04L 41/0233* (2022.01)
*H04B 7/06* (2006.01)
(Continued)

(52) U.S. Cl.
CPC ....... *H04L 41/0233* (2013.01); *H04B 7/0617* (2013.01); *H04B 7/0695* (2013.01);
(Continued)

(58) Field of Classification Search
CPC ............ H04L 41/0233; H04L 41/0816; H04B 7/0617; H04B 7/0695; H04B 7/0626;
(Continued)

(56) References Cited

U.S. PATENT DOCUMENTS 8,983,557 B1   3/2015  Sun et al.
9,307,496 B2 * 4/2016  Saitoh ................. H04W 52/247
(Continued)

FOREIGN PATENT DOCUMENTS

CN         101009896 A      8/2007
CN         101281052 A     10/2008
(Continued)

OTHER PUBLICATIONS

Unknown, Author, "Furthe discussion on E-PDCCH structure", 3GPP TSG RAN WG1 #68, R1-120187, Dresden, Germany, Feb. 6-10, 2012, 1-6.
(Continued)

*Primary Examiner* — Donald L Mills
(74) *Attorney, Agent, or Firm* — Murphy, Bilak & Homiller, PLLC (57) ABSTRACT

In an aspect, a wireless device with a plurality of transmitter chains that can be selectively used to transmit a beam-formed signal determines a targeted receive power for the beam-formed signal, with respect to a target receiving device. The wireless device selects a number of the plurality of transmitter chains for forming the beam-formed signal, based on the targeted receive power and based on an estimated power consumption for each of the plurality of transmitter chains. The selection is performed so as to minimize a total power consumption, given the estimated power consumptions. The wireless device transmits a beam-formed signal, using the selected number of the plurality of transmitter chains.

23 Claims, 5 Drawing Sheets

Related U.S. Application Data 2017, now Pat. No. 10,771,310, which is a continuation of application No. 15/154,403, filed on May 13, 2016, now Pat. No. 10,367,677.

(51) Int. Cl.

| | | |
|---|---|---|
| *H04W 24/10* | (2009.01) | |
| *H04W 52/02* | (2009.01) | |
| *H04J 11/00* | (2006.01) | |
| *H04L 41/0816* | (2022.01) | |
| *H04W 28/02* | (2009.01) | |
| *H04W 16/28* | (2009.01) | |

(52) U.S. Cl.
CPC ....... *H04J 11/0056* (2013.01); *H04J 11/0059* (2013.01); *H04J 11/0079* (2013.01); *H04L 41/0816* (2013.01); *H04W 24/10* (2013.01); *H04W 52/0229* (2013.01); *H04W 52/0245* (2013.01); *H04W 52/0274* (2013.01); *H04B 7/0626* (2013.01); *H04W 16/28* (2013.01); *H04W 28/0221* (2013.01); *Y02D 30/00* (2018.01); *Y02D 30/70* (2020.08)

(58) Field of Classification Search
CPC ..... H04B 7/06; H04J 11/0056; H04J 11/0059; H04J 11/0079; H04W 24/10; H04W 52/0229; H04W 52/0245; H04W 52/0274; H04W 16/28; H04W 28/0221; H04W 52/0251; H04W 52/028; H04W 72/044; H04W 72/0493; Y02D 30/00; Y02D 30/70

See application file for complete search history.

(56) References Cited

U.S. PATENT DOCUMENTS

| | | | |
|---|---|---|---|
| 9,780,856 B2 | 10/2017 | Cai | |
| 10,014,918 B2 | 7/2018 | Capar et al. | |
| 10,110,398 B2* | 10/2018 | Almalfouh | H04B 7/0825 |
| 10,771,310 B2* | 9/2020 | Palenius | H04W 24/10 |
| 2001/0024956 A1 | 9/2001 | You et al. | |
| 2004/0002333 A1 | 1/2004 | Neufeld | |
| 2004/0160925 A1 | 8/2004 | Heo et al. | |
| 2005/0259673 A1 | 11/2005 | Lu et al. | |
| 2007/0087756 A1 | 4/2007 | Hoffberg | |
| 2008/0160918 A1 | 7/2008 | Jeong et al. | |
| 2008/0189360 A1 | 8/2008 | Kiley et al. | |
| 2008/0219210 A1 | 9/2008 | Shuey et al. | |
| 2008/0268863 A1 | 10/2008 | Pedersen et al. | |
| 2009/0029652 A1* | 1/2009 | Xie | H04W 52/0245 455/69 |
| 2009/0093222 A1 | 4/2009 | Sarkar | |
| 2009/0185632 A1 | 7/2009 | Cai et al. | |
| 2009/0323541 A1 | 12/2009 | Sägfors et al. | |
| 2010/0005363 A1 | 1/2010 | Eroz et al. | |
| 2010/0067496 A1 | 3/2010 | Choi | |
| 2010/0080112 A1 | 4/2010 | Bertrand et al. | |
| 2010/0232345 A1 | 9/2010 | Tsai et al. | |
| 2011/0111766 A1 | 5/2011 | Yang et al. | |
| 2012/0081267 A1 | 4/2012 | Sirpal et al. | |
| 2012/0114021 A1 | 5/2012 | Chung et al. | |
| 2012/0140743 A1 | 6/2012 | Pelletier et al. | |
| 2012/0163305 A1 | 6/2012 | Nimbalker et al. | |
| 2012/0260211 A1 | 10/2012 | Sathish et al. | |
| 2012/0263460 A1 | 10/2012 | Movassaghi et al. | |
| 2012/0275401 A1 | 11/2012 | Sun | |
| 2013/0059583 A1 | 3/2013 | Van Phan et al. | |
| 2013/0114391 A1 | 5/2013 | Jang et al. | |
| 2013/0229931 A1 | 9/2013 | Kim | |
| 2014/0010126 A1 | 1/2014 | Sayana et al. | |
| 2014/0016573 A1* | 1/2014 | Nuggehalli | H01Q 1/246 370/328 |
| 2014/0146788 A1 | 5/2014 | Wallentin et al. | |
| 2014/0185481 A1 | 7/2014 | Seol et al. | |
| 2014/0294111 A1 | 10/2014 | Zhang et al. | |
| 2014/0341310 A1 | 11/2014 | Rahman et al. | |
| 2015/0215929 A1 | 7/2015 | Damnjanovic et al. | |
| 2015/0264557 A1 | 9/2015 | Exterman | |
| 2015/0327079 A1 | 11/2015 | Wu et al. | |
| 2015/0373667 A1 | 12/2015 | Rajurkar et al. | |
| 2016/0050643 A1 | 2/2016 | Pudney et al. | |
| 2016/0072572 A1 | 3/2016 | Kang et al. | |
| 2016/0073344 A1 | 3/2016 | Vutukuri et al. | |
| 2016/0087765 A1 | 3/2016 | Guey et al. | |
| 2016/0127140 A1 | 5/2016 | Seo et al. | |
| 2016/0142922 A1 | 5/2016 | Chen et al. | |
| 2016/0157148 A1 | 6/2016 | Kato et al. | |
| 2016/0352551 A1 | 12/2016 | Zhang et al. | |
| 2017/0086141 A1 | 3/2017 | Gal | |
| 2017/0257842 A1 | 9/2017 | Hessler et al. | |
| 2017/0290008 A1 | 10/2017 | Tooher et al. | |
| 2017/0325164 A1 | 11/2017 | Lee et al. | |
| 2017/0331577 A1 | 11/2017 | Parkvall et al. | |
| 2017/0353257 A1 | 12/2017 | Islam et al. | |
| 2018/0063834 A1 | 3/2018 | Abedini et al. | |
| 2018/0124733 A1 | 5/2018 | Vilaipornsawai et al. | |
| 2019/0260549 A1 | 8/2019 | McCoy et al. | |

FOREIGN PATENT DOCUMENTS

| | | |
|---|---|---|
| CN | 101312575 A | 11/2008 |
| CN | 101433102 A | 5/2009 |
| CN | 101610102 A | 12/2009 |
| CN | 101610538 A | 12/2009 |
| CN | 101945417 A | 1/2011 |
| CN | 102065040 A | 5/2011 |
| CN | 102131225 A | 7/2011 |
| CN | 102160323 A | 8/2011 |
| CN | 102291762 A | 12/2011 |
| CN | 102754496 A | 10/2012 |
| CN | 102823290 A | 12/2012 |
| CN | 102859896 A | 1/2013 |
| CN | 102934504 A | 2/2013 |
| CN | 102948226 A | 2/2013 |
| CN | 103220796 A | 7/2013 |
| CN | 103460788 A | 12/2013 |
| CN | 103716081 A | 4/2014 |
| CN | 103891161 A | 6/2014 |
| CN | 103906123 A | 7/2014 |
| CN | 104041149 A | 9/2014 |
| CN | 104205993 A | 12/2014 |
| CN | 104349378 A | 2/2015 |
| CN | 104363624 A | 2/2015 |
| CN | 104769998 A | 7/2015 |
| CN | 104796930 A | 7/2015 |
| CN | 105052192 A | 11/2015 |
| CN | 105357692 A | 2/2016 |
| EP | 2095661 A2 | 9/2009 |
| EP | 2499750 A2 | 9/2012 |
| EP | 2557864 A1 | 2/2013 |
| EP | 3097649 A4 | 9/2017 |
| EP | 3455952 A1 | 3/2019 |
| EP | 3456107 A1 | 3/2019 |
| EP | 3681197 A1 | 7/2020 |
| JP | H09247063 A | 9/1997 |
| JP | 2005311857 A | 11/2005 |
| JP | 2014319780 A | 8/2014 |
| JP | 2017197063 A | 11/2017 |
| JP | 2019523575 A | 8/2019 |
| KR | 20110091535 A | 8/2011 |
| KR | 101312876 B1 | 9/2013 |
| KR | 20130100716 A | 9/2013 |
| KR | 20150143769 A | 12/2015 |
| KR | 20160027969 A | 3/2016 |
| RU | 2330387 C2 | 7/2008 |
| RU | 2012135692 A | 2/2014 |
| WO | 2007060494 A1 | 5/2007 |
| WO | 2008076063 | 6/2008 |
| WO | 2009123955 A1 | 10/2009 |
| WO | 2010107358 A1 | 9/2010 |
| WO | 2011059568 A2 | 5/2011 |
| WO | 2013015726 A1 | 1/2013 |

(56) References Cited

FOREIGN PATENT DOCUMENTS

| | | |
|---|---|---|
| WO | 2014126136 A1 | 8/2014 |
| WO | 2014175656 A1 | 10/2014 |
| WO | 2015111891 A1 | 7/2015 |
| WO | 2016055102 A1 | 4/2016 |
| WO | 2016064048 A1 | 4/2016 |
| WO | 2017196244 A1 | 11/2017 |
| WO | 2017196247 A1 | 11/2017 |
| WO | 2017196249 A1 | 11/2017 |
| WO | 2017197063 A1 | 11/2017 |
| WO | 2018129085 A1 | 7/2018 |

OTHER PUBLICATIONS

Unknown, Author, "Initial views on numerology for NR access techonology", 3GPP TSG RAN WG1 Meeting #84bis R1-163113, Busan, Korea, Apr. 11-15, 2016, 1-12.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.7.0, Sep. 2015, 1-254.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.7.0, Sep. 2015, 1-453.

3GPP, "3rd Generation Partnership Project; Technical Specification Group Radio Access Network; Feasibility study for evolved Universal Terrestrial Radio Access (UTRA) and Universal Terrestrial Radio Access Network (UTRAN) (Release 13)", 3GPP TR 25.912 V13.0.0, Dec. 2015, 1-64.

3GPP, "3rd Generation Partnership Project; Technical Specification Group Radio Access Network; Requirements for Evolved UTRA (E-UTRA) and Evolved UTRAN (E-UTRAN) (Release 9)", 3GPP TR 25.913 V9.0.0, Dec. 2009, 1-18.

3GPP, "3rd Generation Partnership Project; Technical Specification Group Radio Access Network; Requirements for further advancements for Evolved Universal Terrestrial Radio Access (E-UTRA) (LTE-Advanced) (Release 13)", 3GPP TR 36.913 13.0.0, Dec. 2015, 1-15.

3GPP, "3rd Generation Partnership Project; Technical Specification Group Radio Access Network; Scenarios and requirements for small cell enhancements for E-UTRA and E-UTRAN (Release 13)", 3GPP TR 36.932 V13.0.0, Dec. 2015, 1-14.

3GPP, "3rd Generation Partnership Project; Technical Specification Group Radio Access Network; Study on further enhancements of small cell high layer aspects for LTE (Release 13)", 3GPP TR 36.876 V13.0.0, Sep. 2015, 1-8.

3GPP, "3rd Generation Partnership Project; Technical Specification Group Radio Access Network; Study on indoor positioning enhancements for UTRA and LTE (Release 13)", 3GPP TR 37.857 V13.0.0, Sep. 2015, 1-82.

3GPP, "3rd Generation Partnership Project; Technical Specification Group Radio Access Network; Study on performance enhancements for high speed scenario in LTE (Release 13)", 3GPP TR 36.878 V13.0.0, Jan. 2016, 1-92.

3GPP, "3rd Generation Partnership Project; Technical Specification Group Services and System Aspects; 3GPP System Architecture Evolution: Report on Technical Options and Conclusions (Release 8)", 3GPP TR 23.882 V8.0.0, Sep. 2008, 1-234.

3GPP, "3rd Generation Partnership Project; Technical Specification Group Services and System Aspects; Earthquake and Tsunami Warning System (ETWS) requirements; Stage 1 (Release 9)", 3GPP TS 22.168 V9.0.0, Jun. 2008, 1-12.

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.

3GPP, "3rd Generation Partnership Project; Technical Specification Group Services and System Aspects; Network Sharing; Architecture and functional description (Release 13)", 3GPP TS 23.251 V13.1.0, Mar. 2015, 1-39.

3GPP, "3rd Generation Partnership Project; Technical Specification Group Services and System Aspects; Public Warning System (PWS) requirements (Release 13)", 3GPP TS 22.268 V13.0.0, Dec. 2015, 1-16.

3GPP, "3rd Generation Partnership Project; Technical Specification Group Services and System Aspects; Service accessibility (Release 14)", 3GPP TS 22.011 V14.2.0, Mar. 2016, 1-30.

3GPP, "3rd Generation Partnership Project; Technical Specification Group Services and System Aspects; Study on Architecture for Next Generation System (Release 14)", 3GPP TR 23.799 V0.4.0, Apr. 2016, 1-96.

3GPP, "3rd Generation Partnership Project; Technical Specification Group Services and System Aspects; Study on LTE Support for V2X Services (Release 14)", 3GPP TR 22.885 V1.0.0, Sep. 2015, 1-42.

Abrardo, Andrea, et al., "Network Coding Schemes for Device-to-Device Communications Based Relaying for Cellular Coverage Extension", IEEE Signal Processing Advancements for Wireless Communications (SPAWC), Stockholm, Jun. 2015, 1-9.

Arikan, Erdal, "Channel polarization: A method for constructing capacity-achieving codes for symmetric binary-input memoryless channels", IEEE Transactions on Information Theory, vol. 55, Jul. 2009, 3051-3073.

Ashraf, S. A., et al., "Control Channel Design Trade-offs for Ultra-Reliable and Low-Latency Communication System", Globecom, Dec. 2015, 1-6.

Astely, David, et al., "LTE Release 12 and Beyond", IEEE Communications Magazine, vol. 51, No. 7, Jul. 2013, 154-160.

Athley, Fredrik, et al., "Providing Extreme Mobile Broadband Using Higher Frequency Bands, Beamforming, and Carrier Aggregation", 2015 IEEE 26th International Symposium on Personal, Indoor and Mobile Radio Communications—(PIMRC): Mobile and Wireless Networks, 1370-1374.

Atsan, Emre, et al., "Towards integrating Quantize-Map-Forward relaying into LTE", 2012 IEEE Information Theory Workshop, 212-216.

Aydin, Osman, et al., "Final Report on Network-Level Solutions", METIS, Seventh Framework Programme, Document No. ICT-317669-METIS/D4.3, Project Name: Mobile and wireless communications Enablers for the Twenty-twenty Information Society (METIS), Mar. 1, 2015, 1-148.

Aydin, Osman, et al., "Final report on trade-off investigations", METIS, Seventh Framework Programme, Document No. ICT-317669-METIS/D4.2, Project Name: Mobile and wireless communications Enablers for the Twenty-twenty Information Society (METIS), Version 1, Aug. 29, 2014, 1-96.

Belleschi, Marco, et al., "Benchmarking Practical RRM Algorithms for D2D Communications in LTE Advanced", Wireless Personal Communications, vol. 82, Issue 2, May 2015, 883-910.

Colombi, D., et al., "Implications of EMF Exposure Limits on Output Power Levels for 5G Devices above 6 GHz", IEEE Antennas and Wireless Propagation Letters ( vol. 14 ), Feb. 4, 2015, 1247-1249.

Da Silva, Icaro, et al., "Tight integration of LTE and new 5G air interface to fulfill 5G requirements", Workshop on 5G Architecture, VTC Spring 2014, Glasgow, Spring 2014, 1-5.

Da Silva Jr., José Mairton B., et al., "Performance Analysis of Network-Assisted Two-Hop D2D Communications", 10th IEEE Broadband Wireless Access Workshop, Austin, TX, USA, Dec. 2014, 1-8.

Duarte, Melissa, et al., "Quantize-Map-Forward (QMF) Relaying: An Experimental Study", Proceedings of the fourteenth ACM international symposium on Mobile ad hoc networking and computing (MobiHoc '13), 2013, 227-236.

El Hattachi, Rachid, et al., "NGMN 5G White Paper", A Deliverable by the NGMN Alliance, Version 1.0, Feb. 17, 2015, 1-125.

(56) References Cited

OTHER PUBLICATIONS

Felström, Alberto Jiménez, et al., "Time-Varying Periodic Convolutional Codes With Low-Density Parity-Check Matrix", IEEE Transactions on Information Theory, vol. 45, No. 6, Sep. 1999, 2181-2191.

Fodor, Gabor, et al., "A Comparative Study of Power Control Approaches for Device-to-Device Communications", IEEE International Conference on Communications (ICC), Budapest, Hungary, Jun. 2013, 1-7.

Fodor, G., et al., "Device-to-Device Communications for National Security and Public Safety", IEEE Access, vol. 2, Dec. 18, 2014, 1510-1520.

Furuskar, A., et al., "5G Use Cases", Media Delivery Use Cases, 1-18.

Garg, Nikhil, "Fair Use and Innovation in Unlicensed Wireless Spectrum", WISE, IEEE, Jul. 31, 2015, 1-74.

Giard, Pascal, et al., "Unrolled Polar Decoders, Part I: Hardware Architectures", 1-10.

Gunnarsson, Fredrik, et al., "Particle Filtering for Network-Based Positioning Terrestrial Radio Networks", Data Fusion and Target Tracking Conference, Liverpool, UK, Apr. 2014, 1-7.

Gustavsson, Ulf, et al., "On the Impact of Hardware Impairments on Massive MIMO", IEEE Globecom 2014, Austin, Texas, USA, 2014, 1-7.

Hemachandra, Kasun T., et al., "Sum-Rate Analysis for Full-Duplex Underiay Device-to-Device Networks", IEEE Wireless Communications and Networking Conference (WCNC), Istanbul, Turkey, Apr. 6-9, 2014, 1-6.

Imran, Muhammad Ali, et al., "Deliverable D6.4 Final Integrated Concept", Energy Aware Radio and network Technologies (EARTH) INFSO-ICT-247733 EARTH https://bscw.ictearth.eu/pub/bscw.cgi/d49431/EARTH_WP6_D6.4.pdf., Jun. 2012, 1-95.

Inomata, Minoru, et al., "ICNIRP Publication", IEICE Communications Express, vol. 4, No. 5, May 29, 2015, 149-154.

Jacobsson, Sven, et al., "One-Bit Massive MIMO: Channel Estimation and High-Order Modulations", IEEE ICC2015 Communications Workshop, London, UK, 2015, 1-6.

Johansson, Niklas A., et al., "Radio Access for Ultra-Reliable and Low-Latency 5G Communications", IEEE ICC 2015—Workshop on 5G & Beyond—Enabling Technologies and Applications, Jun. 8-12, 2015, 1184-1189.

Kleinrock, Leonard, et al., "Packet Switching in Radio Channels: Part I-Carrier Sense Multiple-Access Modes and Their Throughput-Delay Characteristics", IEEE Transactions on Communications, vol. COM-23, No. 12, Dec. 1975, 1400-1416.

Korada, Satish Babu, "Polar Codes for Channel and Source Coding", Ph D. thesis, E'cole Polytechnique Federale de Lausanne (EPFL), Jul. 15, 2009, 1-181.

Kusume, Katsutoshi, et al., "Updated scenarios, requirements and KPIs for 5G mobile and wireless system with recommendations for future investigations", Metis, Seventh Framework Programme, Document No. ICT-317669-METIS/D1.5,Project Name: Mobile and wireless communications Enablers for the Twenty-twenty Information Society (METIS), Apr. 30, 2015, 1-57.

Li, Gen, et al., "5G Spectrum: Is China ready?", IEEE Communications Magazine, Jul. 2015, 58-65.

Li, Gen, et al., "Coordination context-based spectrum sharing for 5G millimeter-wave networks", 2014 9th International Conference on Cognitive Radio Oriented Wireless Networks (CROWNCOM), Oulu, Finland, Jun. 2014, 32-38.

Li, Zhe, "Performance Analysis of Network Assisted Neighbor Discovery Algorithms", KTH Electrical Engineering, Degree Project in Automatic Control, Second Level, Stockholm, Sweden, XR-EE-RT 2012:026, 2012, 1-64.

Wang, Zhi-Heng, et al., "System Modeling and Performance Optimization for the Power Saving Strategy of DRX in LTE", LTE DRX, College of Computer Science and Technology, Dec. 16, 2014, 1-9.

Unknown, Author, "Initial views on frame structure for NR access technology", 3GPP TSG RAN WG1 Meeting #84bis, R1-163112, Busan, Korea, Apr. 11-15, 2016, 1-7.

Unknown, Author, "LTE; Evolved Universal Terrestrial Radio Access (E-UTRA); Physical layer procedures (3GPP TS 36.213 version 13.1.1 Release 13)", ETSI TS 136 213 V13.1.1, May 2016, 1-363.

Unknown, Author, "MIMO/beamforming for 5G new radio interface for over-6GHz: system architecture and design aspects", Samsung, 3GPP TSG RAN WG1 #84bis, R1-162183, Busan, Korea, Apr. 11-15, 2016, 1-7.

Unknown, Author, "NB-IoT—NPRACH Sequences", 3GPP TSG RAN WG1 NB-IoT Ad-Hoc Meeting, R1-161834, Sophia Antipolis, France, Mar. 22-24, 2016, 1-6.

Unknown, Author, "NR C-DRX Operations with Beam Management", Samsung, 3GPP TSG.RAN WG2 2017 RAN2 #97 Meeting, R2-1701994, Athens, Greece, Feb. 13-17, 2017, 1-5.

Unknown, Author, "Overview of 5G frame structure", Huall'ei, HiSilicon; 3GPP TSG RAN WG I Meeting #84bis, R1-162157, Busan, Korea, Apr. 11-15, 2016, 1-6.

Unknown, Author, "Overview of new radio access technology requirements and designs", 3GPP TSG RAN WG1 Meeting #84bis, R1-162379, Busan, Korea, Apr. 11-15, 2016, 1-4.

Unknown, Author, "PDSCH Transmissions for Low Cost UEs", Samsung, 3GPP TSG RAN WG1 #82bis, R1-155431, Malmo, Sweden, Oct. 5-9, 2015, 1-4.

Unknown, Author, "Performance and complexity of Turbo, LDPC and Polar codes", Nokia, Alcatel-Lucent Shanghai Bell, 3GPP TSG-RAN WG1 #84bis, R1-162897, Busan, Korea, Apr. 11-15, 2016, 1-5.

Unknown, Author, "Preliminary view on Initial Access in 5G", 3GPP TSG-RAN WG2 Meeting #93bis, R2-162300, Dubrovnik, Croatia, Apr. 15-15, 2016, 1-3.

Jnknown, Author, "Proposal for Study on a Next Generation System Architecture", China Mobile et al., SA WG2 Meeting #111, S2-153651 (revision of S2-153573), ChengDu, China (revision, Oct. 19-23, 2015, 1-6.

Unknown, Author, "Remaining Details on DCI Contents", Samsung, 3GPP TSG RAN WG1 Meeting #84bis, R1-163275, Busan, Korea, Apr. 11-15, 2016, 1-4.

Unknown, Author, "RRM requirements for New Radio Access Technology", Ericsson, 3GPP TSG-RAN WG4 Meeting # 78bis, R4-161726, San Jose del Cabo, Mexico, Apr. 11-15, 2016, 1-5.

Unknown, Author, "Scenario & design criteria on flexible numerologies", Huawei, HiSilicon; 3GPPTSG RAN WGI Meeting #84bis, R1-162156, Busan, Korea,, Apr. 11-15, 2016, 1-7.

Unknown, Author, "Solution for selection of a network slice instance", Ericsson, SA WG2 Meeting #114, S2-161480, Sophia Antipolis, Apr. 11-15, 2016, 1-4.

Unknown, Author, "Solution: PDU Sessions served by different Network Slices", Motorola Mobility, Lenovo, SA WG2 Meeting #114, S2-161574, Apr. 11-15, 2016, 1-4.

Unknown, Author, "Summary of email discussion RACH open cases", 3GPP TSG-RAN WG2 NB-IoT AdHoc, R2-163251, Sophia Antipolis, France, May 3-4, 2016, 1-14.

Unknown, Author, "Support for Beam Based Common Control Plane in 5G New Radio", Nokia, Alcatel-Lucent Shanghai Bell, 3GPP TSG-RAN WG1 #84bis, R1-162895, Busan, Korea, Apr. 11-15, 2016, 1-4.

Unknown, Author, "Tight integration of the New Radio interface (NR) and LTE: Control Plane design", 3GPP TSG-RAN WG2 #93bis, Tdoc R2-162753, Dubrovnik, Croatia, Apr. 11-15, 2016, 1-5.

Unknown, Author, "UL scheduling for Rel-14 eLAA", CATT, 3GPP TSG RAN WG1 Meeting #84bis, R1-162260, Busan, Korea, Apr. 11-15, 2016, 1-3.

Unknown, Author, "Uplink latency reduction with prescheduling", HTC, 3GPP TSG RAN WG1 Meeting #84bis, R1-162530, Busan, Korea, Apr. 11-15, 2016, 1-2.

Unknown, Author, "Waveform for NR", Ericsson, 3GPP TSG-RAN WG1 #84bis, R1-163222, Busan, South Korea, Apr. 11-15, 2016, 1-5.

(56) References Cited

OTHER PUBLICATIONS

Wang, Xinhua, "Joint Antenna Selection and Beamforming Algorithms for Physical Layer Multicasting with Massive Antennas", MDPI, Algorithms 2016, vol. 9, Issue 2, 2016, 1-9.
Wiemann, Henning, et al., "A Novel Multi-Hop ARQ Concept", Vehicular Technology Conference, 2005, VTC 2005, IEEE 61st (vol. 5), Spring 2005, 1-5.
Yilmaz, Osman N. C., et al., "Analysis of Ultra-Reliable and Low-Latency 5G Communication for a Factory Automation Use Case", ICC Workshop on 5G Enablers and Applications, Spring 2015, 1-6.
Yilmaz, Osman N. C., et al., "Smart Mobility Management for D2D Communications in 5G Networks", IEEE WCNC 2014, Istanbul, Turkey, Apr. 6-9, 2014, 1-5.
Yin, Zhanping, et al., "Short Physical Uplink Control Channel (PUCCH) Design for 5th Generation (5G) New Radio (NR)", Unpublished Colombian patent application No. NC20190008014, 1-119.
Unknown, Authoer, "Multiplexing and multiple access for mmWave networks", 3GPP TSG RAN WG1 Meeting #84bis, R1-162568, Busan, Korea, Apr. 11-15, 2016, 1-3.
Unknown, Author, "Channeling Coding for NR", 3GPP TSG RAN WG1 Meeting #84bis, RI-163114, Busan, Korea, Apr. 11-15, 2016, pp. 1-10.
Unknown, Author, "Considerations on channel coding for NR", 3GPP TSG RAN WG1 Meeting #84bis, R1-163130, Busan, Korea, Apr. 11-15, 2016, pp. 1-3.
Kwon, Sang-Wook, et al., "Performance Analysis of DRX Mechanism Considering Analogue Beamforming in Millimeter-Wave Mobile Broadband System", IEEE Globecom Workshops, 2014, 802-807.
Ting, Kuo-Chang, et al., "Energy-Efficient DRX Scheduling for QoS Traffic in LTE Networks", Ninth IEEE International Symposium on Parallel and Distributed Processing with Applications, 2011, 213-218.
Wigard, Jeroen, et al., "On the User Performance of LTE UE Power Savings Schemes with Discontinuous Reception in LTE", Nokia Siemens Networks, Research Center Aalborg, 2009, 1-5.
Luby, Michael G., et al., "Improved Low-Density Parity-Check Codes Using Irregular Graphs", IEEE Transactions on Information Theory, vol. 47, No. 2, Feb. 2001, 585-598.
Marsch, Patrick, et al., "Preliminary Views and Initial Considerations on 5G RAN Architecture and Functional Design", 5G PPP, METIS II, White Paper, Mar. 8, 2016, 1-27.
Medbo, J., et al., "Channel Modelling for the Fifth Generation Mobile Communications", Antennas and Propagation (EuCAP), 2014 8th European Conference on. IEEE, 2014, 1-5.
Meinilä Juha, et al., "D5.3: Winner+ Final Channel Models", Winner +, Celtic Telecommunication Solutions, Project No. CELTIC/CP5-026, Project Title: Wireless World Initiative New Radio—Winner+, Version 1.0, Jun. 30, 2010, 1-107.
Mollén, Christopher, et al., "Out-of-Band Radiation Measure for MIMO Arrays with Beamformed Transmission", Submitted to ICC 2016, Kuala Lumpur, Malaysia, 2016, 1-6.
Motoyama, Shusaburo, "Flexible Polling-based Scheduling with QoS Capability for Wireless Body Sensor Network", 8th IEEE International Workshop on Performance and Management of Wireless and Mobile Networks, P2MNET 2012, Clearwater, Florida, 2012, 745-752.
Nagpal, Vinayak, "Quantize-Map- and-Forward Relaying: Coding and System Design", Forty-Eighth Annual Allerton Conference, Allerton House, UIUC, Illinois, USA, Sep. 29-Oct. 1, 2010, 443-450.
Nazer, Bobak, et al., "Compute- and-Forward: Harnessing Interference through Structured Codes", IEEE Trans Info Theory, vol. 57, Oct. 2011, 6463-6486.
Nurmela, Vuokko, et al., "METIS Channel Models", METIS, Seventh Framework Programme, Document No. ICT-317669-METIS/D1.4, Project Name: Mobile and wireless communications Enablers for the Twenty-twenty Information Society (METIS), Jul. 14, 2015, 1-223.
Popovski, Petar, "Ultra-Reliable Communication in 5G Wireless Systems", 1st International Conference on 5G for Ubiquitous Connectivity, Levi, Finland, Nov. 2014, 1-6.
Pradini, Aidilla, et al., "Near-Optimal Practical Power Control Schemes for D2D Communications in Cellular Networks", European Conference on Networks and Communications (EuCNC), Bologna, Italy, Jun. 23-26, 2014, 1-5.
Qianxi, Lu, et al., "Clustering Schemes for D2D Communications Under Partial/No Network Coverage", 79th IEEE VTC Spring, May 18-21, 2014, 1-6.
Rangan, Sundeep, et al., "Millimeter Wave Cellular Wireless Networks: Potentials and Challenges", Proceedings of the IEEE, vol. 102, Issue 3, Feb. 5, 2014, 366-384.
Rosowski, Thomas, et al., "Description of the spectrum needs and usage principles", METIS, Seventh Framework Programme, Document No. ICT-317669-METIS/D5.3, Project Name: Mobile and wireless communications Enablers for the Twenty-twenty Information Society (METIS), Aug. 29, 2014, 1-106.
Sachs, Joachim, et al., "Virtual Radio—A Framework for Configurable Radio Networks", Proceedings of the 4th Annual International Conference on Wireless Internet (WICON '08), Maui, Hawaii, USA, Nov. 17-19, 2008, 1-7.
Sahlin, Henrik, et al., "Random Access Preamble Format for Systems with Many Antennas", International Workshop on Emerging Technologies for 5G Wireless Cellular Networks, IEEE GLOBECOM 2014, Austin, TX, USA, Dec. 8, 2014, 1-6.
Sattiraju, Raja, "Reliability Modeling, Analysis and Prediction of Wireless Mobile Communications", Chair for Wireless Communication and Navigation, University of Kaiserslautern, Kaiserslautern, Germany, 2014, 1-6.
Schotten, Hans D, et al., "Availability Indication as Key Enabler for Ultra-Reliable Communication in 5G", 2014, 1-5.
Ström, Erik G., et al., "5G Ultra—Reliable Vehicular Communication", http://arxiv.org/abs/1510.01288, Version 1.1, Oct. 3, 2015, 1-13.
Sun, Shu , et al., "Millimeter Wave Multi-beam Antenna Combining for 5G Cellular Link Improvement in New York City", 2014 IEEE International Conference on Communications (ICC),, Jun. 2014, 5468-5473.
Sun, Wanlu , et al., "Resource Sharing and Power Allocation for D2D-based Safety-Critical V2X Communications", IEEE ICC 2015, London, UK, Jun. 8-12, 2015, 1-7.
Svensson, Stefan, "Challenges of Wireless Communication in Industrial Systems", ABB Corporate Research, 1-18.
Tal, I. , et al., "List Decoding of Polar Codes", Proceedings of IEEE Symp. Inf. Theory, 2011, 1-81.
Thorpe, J., "Low-Density Parity-Check (LDPC) Codes Constructed from Protographs", IPN Progress Report 42-154, Aug. 15, 2003, 1-7.
Unknown, Author, "5G—Key Component of the Networked Society", RWS-150009, 3GPP RAN Workshop on 5G, Phoenix, Arizona, USA, Sep. 17-18, 2015, 1-55.
Unknown, Author, "5G Automotive Vision", 5G-Infrastructure-Association, https://5g-ppp.eu/white-papers/, Oct. 20, 2015, 1-67.
Unknown, Author, "5G Radio Access", Ericsson White Paper, Uen 284 23-3204 Rev B, Apr. 2016, 1-10.
Unknown, Author, "5G Systems", Ericsson White Paper, Uen 284 23-3244, Jan. 2015, 1-14.
Unknown, Author, "Active Mode Mobility in NR: SINR drops in higher frequencies", 3GPP TSG-RAN WG2 #93bis, R2-162762, Dubrovnik, Croatia, Ericsson, Apr. 11-15, 2016, 1-4.
Unknown, Author, "Active Transmission/Reception Time Reduction for DL Control Signaling", Samsung, 3GPP TSG RAN WG1 #80, R1-150349, Athens, Greece, Feb. 9-13, 2015, 1-4.
Unknown, Author, "Carrier aggregation in LTE-Advanced", Ericsson, TSG-RAN WG1 #53bis, R1-082468, Warsaw, Poland, Jun. 30-Jul. 4, 2008, 1-6.
Unknown, Author, "Channel coding for new radio interface", Intel Corporation, 3GPP TSG RAN WG1 Meeting #84bis, R1-162387, Busan, South Korea, Apr. 11-15, 2016, 1-4.
Unknown, Author, "Channel interleaver correction for eMTC", 3GPP TSG RAN WG1 Meeting #84bis, R1-163349, Busan, Korea, Apr. 11-15, 2016, 1-2.

(56) References Cited

OTHER PUBLICATIONS

Unknown, Author, "Consideration on higher layer procedures in 5G NR", 3GPP TSG-RAN WG2 Meeting #93bis, R2-162568, Dubrovnik, Croatia, Apr. 11-15, 2016, 1-3.

Unknown, Author, "Control details for UL scheduling in LAA", Qualcomm Incorporated, 3GPP TSG RAN WG1 #84bis, R1-163022, Busan, Korea, Apr. 11-15, 2016, 1-6.

Unknown, Author, "Council Recommendation of Jul. 12, 1999 on the limitation of exposure of the general public to electromagnetic fields (0 Hz to 300 GHz)", Official Journal of the European Communities, L199, Jul. 30, 1999, 59-70.

Unknown, Author, "Deliverable D4.1 Draft air interface harmonization and user plane design", METIS II, Mobile and wireless communications Enablers for the Twenty-twenty Information Society-II, May 4, 2016, 1-129.

Unknown, Author, "Design aspects of control signaling for V2V communication", Intel Corporation, 3GPP TSG RAN WG1 Meeting #84, R1-160701, St Julian's, Malta, Feb. 15-19, 2016, 1-8.

Unknown, Author, "Details on NR impact to support unlicensed operation", Ericsson, 3GPP TSG-RAN WG2 #93bis, R2-162751, Dubrovnik, Croatia, Apr. 11-15, 2016, 1-3.

Unknown, Author, "Discussion on MTC Idle states", 3GPP TSG-WG #69-bis, R2-102033, Beijing, Apr. 12-16, 2010, 1-4.

Unknown, Author, "Electronic Code of Federal Regulations, Title 47: Telecommunication, Chapter 1, Subchapter A, Part 2—Frequency Allocations and Radio Treaty Matters; General Rules and Regulations", eCFR—Code of Federal Regulations, http://www.ecfr.gov/cgi-bin/text-idx?SID=088e5625b9e603b91aa3601b . . . , Jun. 20, 2016, 1-217.

Unknown, Author, "ETSI TR 102 889-2 V1.1.1", Electromagnetic compatibility and Radio spectrum Matters (ERM); System Reference Doc; Short Range Devices(SRD); Part 2: Technical characteristics for SRD equipment for wireless industrial applications using technologies different from Ultra-Wide Band(UWB), Aug. 2011, 1-37.

Unknown, Author, "Flexible air interface of NR", 3GPP TSG-RAN2 Meeting #93-bis, R2-162660, Dubrovnik, Croatia, Apr. 11-15, 2016, 1-5.

Unknown, Author, "FlexWare Flexible Wireless Automation in Real-Time Environments", Seventh Framework Programme, PNR 224350, Work Package 1 ystem Architecture, Task 1.1 System Requirements Analysis, Deliverable D1.1, FP7-224350, 2008, 1-197.

Unknown, Author, "Frame structure design of new RAT", ZTE, 3GPP TSG RAN WG1 Meeting #84bis, R1-162228, Busan, Korea, Apr. 11-15, 2016, 1-5.

Unknown, Author, "Guidelines for evaluation of radio interface", International Telecommunication Union; ITU-R, Radiocommunication Sector of ITU; Rep. ITU-R M.2135-1; M Series, Mobile, radiodetermination, amateur and related satellites services, Dec. 2009, 1-72.

Unknown, Author, "Handling of inactive UEs", 3GPP TSG-RAN WG3 #91 bis R3-160845 Bangalore, India, Apr. 11-15, 2016, 1-4.

Unknown, Author, "ICNIRP Guidelines for Limiting Exposure to Time-Varying Electric, Magnetic and Electromagnetic Fields (up to 300 GHz)", International Commission on Non-Ionizing Radiation Protection, ICNIRP Publication, 1998, 1-34.

Unknown, Author, "IMT Vision—Framework and overall objectives of the future development of IMT for 2020 and beyond", International Telecommunication Union; ITU-R Radiocommunication Sector of ITU; Recommendation ITU-RM.2083-0; M series, Mobile, radiodetermination, amateur and related satellite services, Sep. 2015, 1-21.

Unknown, Author, "Initial considerations on system access in NR", Ericsson, 3GPP TSG RAN WG1 Meeting #84, R1-163237, Busan, South Korea, Apr. 11-15, 2016, 1-3.

Unknown, Author , "Comments and suggestions on baseline RRC CR for DC", 3GPP TSG RAN WG2 #88 R2-145109, San Francisco, USA, Nov. 17-21, 2014, 1-76.

\* cited by examiner

PROCEDURES TO CONTROL BEAMFORMING

TECHNICAL FIELD

The present disclosure is related to wireless devices in mobile communication networks, and is more particularly related to techniques for controlling antenna beamforming by such devices.

BACKGROUND

In today's widely deployed wireless communications networks, such as the Long Term Evolution (LTE) wireless data networks developed by members of the $3^{rd}$-Generation Partnership Project (3GPP), the wireless terminals, referred to in 3GPP documentation as "user equipments," or "UEs," are not configured to perform beamforming in uplink (wireless-terminal-to-base-station) transmissions. This is anticipated to change in so-called fifth-generation (5G) wireless networks, where at least some wireless terminals will be capable of beamforming in uplink transmissions, using multiple transmitter chains driving multiple antenna elements.

It will be understood that beamforming, as a general matter, is the combination of radio signals from a set of small non-directional (or low-gain) antennas to simulate a large directional antenna. By controlling the phase and amplitude of the signal at each antenna, the resulting antenna pattern may be shaped and steered electronically, to create a certain beam width or to maximize its gain in a desired direction.

As a general matter, beamforming can be analog or digital, with the former utilizing analog phase shifters to create phase differences between the signals supplied to each antenna element and the latter using digital techniques to create the needed phase shifts of the transmitted signal at the several antenna elements of the transmitter array. Digital beamforming techniques are expected to be used in 5G wireless devices. Several transmitter (TX) chains are needed, with each transmitter chain in a digital beamformer including a digitally controllable signal source feeding a high-power amplifier, which is then coupled to one of several transmitter elements in an array. The antenna elements together form an antenna aperture. The more transmitter chains used to drive the antenna aperture, the narrower the beam can be.

Figure 1:
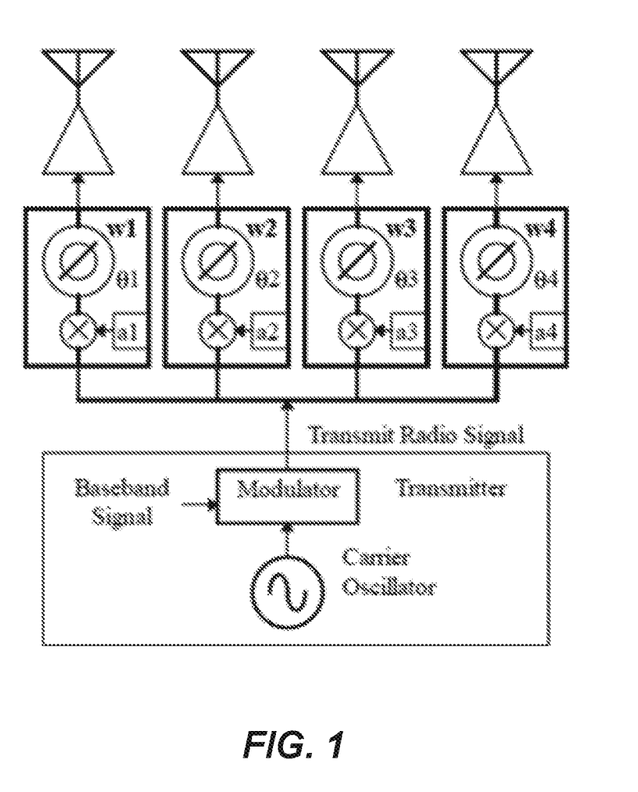
FIG. 1 illustrates an example transmit beamformer with four antenna elements.

In each transmitter chain, the phase shift and amplitude of the signal driving the antenna element can be individually controlled. The beamforming is achieved by using several transmit chains and controlling the phase and amplitudes of the signals transmitted from each chain so that they add up constructively in one direction, while adding up destructively in other directions. This results in an overall antenna gain in some directions and a loss in other directions, especially when there are more than two transmitters. FIG. 1 illustrates an example transmit beamformer with four antenna elements—as seen in the figure, each antenna element is fed by a high-power amplifier, with each high-power amplifier in turn being fed by a complex-weighting element, which applies a phase shift $\theta_k$ and an amplitude weight $a_k$ to a copy of the signal to be transmitted. Together, the phase shift and amplitude weight constitute a complex-valued weight $w_k$. In a digital beamformer, this phase shifting and amplitude weighting is performed digitally, e.g., before upconverting a baseband version of the weighted signal to a radio frequency signal for amplification and transmission.

The benefits of beamforming are manifold, and include enhanced coverage, longer achieved ranges using the same output power, and, in many cases, less multipath at the receiver side. The probability of interference towards other radio links can be significantly reduced, as the wireless terminal does not transmit significant energy in directions other than the direction of the intended receiver. This also increases efficiency, as the transmitted signal is not wasted in the form of interference towards other receivers in other directions.

While uplink beamforming can be used to provide significant performance gains, a key tradeoff is the power consumption of the device. Each distinct transmit chain in the beamforming device comprises a power amplifier and possibly comprises additional analog components, such as a mixer and local oscillator amplifiers. Each of these components consumes extra power, some of which is independent of the signal amplitude produced by that chain. As a result, even if the total output power from the combined transmitter is the same as when only one transmitter is used, the total power consumption when using several transmitter chains can be substantially higher. Thus, a narrow beam, produced by combining signals from several transmitter chains, requires a higher power consumption than a non-directional beam with the same transmitted power.

Another problem with narrow beams is that they are more sensitive to changes in the orientation of the wireless device, as compared to wider or non-directional beams.

SUMMARY

Embodiments of the present invention provide beamforming solutions for a wireless device that address the problems described above. This may include a wireless device (e.g., UE) that controls the number of active transmit antennas that are used for a communication, in order to minimize the power consumption while still maintaining the uplink coverage.

According to some embodiments, a method, in a wireless device having a plurality of transmitter chains that can be selectively used to transmit a beam-formed signal, includes determining a targeted receive power for the beam-formed signal, with respect to a target receiving device. The method also includes selecting a number of the plurality of transmitter chains for forming the beam-formed signal, based on the targeted receive power and based on an estimated power consumption for each of the plurality of transmitter chains, where said selecting is performed so as to minimize a total power consumption, given the estimated power consumptions. The method further includes transmitting a beam-formed signal, using the selected number of the plurality of transmitter chains.

According to some embodiments, a wireless device includes a plurality of transmitter chains that can be selectively used to transmit a beam-formed signal and processing circuitry operatively associated with the plurality of transmitter chains. The processing circuitry is configured to determine a targeted receive power for the beam-formed signal, with respect to a target receiving device and select a number of the plurality of transmitter chains for forming the beam-formed signal, based on the targeted receive power and based on an estimated power consumption for each of the plurality of transmitter chains. The selecting is performed so as to minimize a total power consumption, given the estimated power consumptions. The processing circuitry is configured to transmit a beam-formed signal, using the selected number of the plurality of transmitter chains.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

DETAILED DESCRIPTION

Described below are detailed examples of several embodiments of techniques and apparatus for controlling the beamforming of a signal. These techniques may be especially beneficial in a wireless terminal, but are not limited to such, and can be implemented in any transmitting wireless device having multiple transmit antennas. Further, although terminology such as "5G" is used in this disclosure to place the presently disclosed techniques and apparatus in an example context, this should not be seen as limiting the scope of the invention to only 5G systems. Other wireless systems may also benefit from exploiting the ideas covered within this disclosure.

Because the techniques described herein are not limited in their application to wireless terminals, terminology such as base station and UEs should be considered as exemplary in nature and non-limiting, unless the context clearly indicates otherwise, and in particular does not imply a certain hierarchical relation between the two; in general, a "base station" could be considered as device 1 and a "UE" could be considered as device 2, where these two devices communicate with each other over some radio channel.

As noted above, while beamforming in wireless devices can be used to obtain substantial performance benefits, such as improving link quality while reducing interference, the overall power consumption of the beamforming device may be undesirably high in some scenarios. As was explained above, each distinct transmit chain in the beamforming device includes a power amplifier and possibly other analog components, with each of these components consuming extra power, some of which is independent of the signal amplitude produced by that chain. Thus, even if the total output power a beamforming transmitter is the same as when only one transmitter is used, the total power consumption resulting from the use of several transmitter chains can be substantially higher.

Also noted above was that narrow beams are more sensitive to changes in the orientation of the wireless device, as compared to wider or non-directional beams. While a narrow beam can provide the highest possible link gain and thus support the highest possible data rates, this is only the case when it is properly directed towards the receiving base station or device. This may be difficult to achieve on a consistent basis with portable wireless terminals, as the orientation of the terminals changes frequently. Accordingly, another tradeoff to consider when forming a beamformed signal is the tradeoff between beam width and the required accuracy in pointing the beam.

The power consumption of the wireless device transmitter is decided by the total transmission power and the number of transmit chains. According to several of the presently disclosed techniques, the power consumption of the wireless device is optimized by changing the number of transmit antennas used to perform the beamformed signal, based on a desired receive signal power at the targeted device. By reducing the number of transmit antennas when circumstances permit, the power consumption related to the number of transmit chains is reduced. Of course, at the same time the maximum possible antenna gain in the intended direction (i.e., at the peak of the antenna main lobe) is reduced. As a result, when reducing the number of transmission antennas used to form the beamformed signal, the transmit power may need to be increased, since in the worst case the maximum uplink power is not enough to reach the target device (e.g., a 5G base station) with the intended data rate.

According to several embodiments of the presently disclosed techniques, then, a UE or other wireless device controls the number of active transmit antennas, as a function of a desired receive signal power at the targeted device and an estimated propagation loss between the transmitting and receiving device, so as to minimize the power consumption while still maintaining the uplink coverage. The targeted receive signal power at the receiving device in turn may be determined as a function of a desired data rate for the link.

Hence, there are tradeoffs when optimizing power consumption and power efficiency, depending on link coverage. These tradeoffs basically are to optimize the long-term power consumption based on the improvements in coverage when increasing the number of transmit antennas compared with the reduced power consumption when decreasing the number of transmit antennas. This can be performed in the UE or wireless device based on the device's knowledge of the power consumption of a transmit chain, propagation loss estimations in downlink and/or uplink and the intended data rate in the link. With the propagation loss estimations, the required transmission power for a certain data rate can be estimated. The data rate to optimize for can be based on the intended data rate or the amount of data in the transmit buffer.

There are other potential benefits for a UE or other wireless device to change the number of transmitter chains used to form a beamformed signal. For instance, when a wider antenna lobe is used, the radio link is less sensitive to a UE that is moving. A handheld UE in a car that is in a discontinuous reception (DRX) mode may change direction both because of changes in how the UE is held as well as changes in direction of the vehicle. If measurements of the link quality are not performed often enough, so that the direction of the beam can be quickly adjusted to track these changes, then there is then a risk that a beam is transmitted in the wrong direction. If that probability is high, it could be beneficial to have a wider antenna beam. Accordingly, some embodiments of the disclosed techniques incorporate information about the motion and/or type of wireless device when determining how many transmitter chains should be used to form the beamformed signal.

According to some embodiments of the presently disclosed techniques, a UE or other wireless device thus selects a number of active transmit chains to use in producing a beamformed signal, so as to save power with a limited loss in received data rate. The immediate advantage of reducing the number of transmit chains is that the power consumption can be reduced. At the same time, however, there is a tradeoff for the antenna gain. When the gain is decreased by using fewer transmit chains it also means that the device's transmit power needs to be increased, to keep the same data rate. This increase in transmit power is also taken into account when selecting the number of transmit chains to be used.

When the coverage is good, i.e., when the estimated propagation loss between the wireless device and the target receiver is relatively low, the required transmit power will be relatively low. In this case, the extra transmit power needed to compensate for a reduced antenna gain when selecting a smaller number of transmit chains may be lower than the power needed to use more transmit chains. Thus, the total power consumption is decreased by reducing the number of transmit chains. Conversely, when the propagation loss between the wireless device and the target receiver is relatively high, a narrower beam and higher antenna gain may be required to maintain a desired link quality and data rate. Of course, these conditions change from time to time, and sometimes rapidly. Thus, the UE or other wireless device, periodically evaluates whether the power consumption can be improved by changing the number of transmit antenna chains that is used.

According to some embodiments, the evaluation is based on the following steps.

First, the wireless device determines what antenna gain is required to reach the target device, such as the base station in a wireless network. This requirement is a function of the propagation loss between the wireless device and the target receiver, which can be estimated based on link quality measurements performed by the wireless device, or link quality measurements performed by the target device and fed back to the wireless device, or a combination of both. The required antenna gain is also based on a desired data rate, which will in turn dictate a minimum signal-to-noise-plus-interference ratio (SINR) at the receiving device for any given modulation and coding scheme.

Second, the wireless device determines the number of transmitters to use, based on the antenna gain needed to reach the target device. The number of transmitters in the wireless device can be specified based on the following parameters: the power consumption per transmitter, as a function of transmit power; the antenna gain that is reached in the main lobe of the antenna pattern for each configurable number of used transmitters; the estimated propagation loss between the wireless device and the target receiver; and the desired receive power at the target receiver.

The wireless device may also base the number of transmit chains to use on the amount and quality of available spatial channel knowledge at the wireless device, where this spatial channel knowledge provides an indication of how much the wireless device can assume that the receiver power is increased or decreased by narrowing and widening the beam. With low quality knowledge of the channel, a narrower transmission beam cannot be expected to give full gain in practice.

The decision regarding the number of transmit chains may be based, at least in part, on an estimate of how high a data rate can be reached, given the antenna gain achievable with each considered number of transmit chains. The estimate of the data rate achievable is based on an estimated propagation loss for the link and may, during an active communication, be based on the Power Commands for a current configuration and achieved data rate.

In some embodiments, the estimated propagation loss for an uplink and/or estimated data rate for the uplink can be based on uplink measurements in a base station, which are signaled to the wireless device for use by the wireless device in determining how many transmit chains to use for beamforming an uplink transmission. The estimated uplink propagation loss and/or data rate can also or alternatively be based on the downlink propagation loss and the interference level measured in the UE.

The period over which the wireless device performs the above-mentioned evaluations or the repetition rate at which these evaluations are repeated may be pre-determined or fixed. The period and/or repetition rate may also be dynamically determined, based on any of several different factors. In one example, the period may be a function of the speed of the wireless device, and may decrease as the UE moves faster. In another example, the period may be a function of the type of the device, which also defines the type of applications the device is intended to be used for. For instance, a device that is connected to a high-speed train may be configured with a shorter period than that of a device connected to a low speed vehicle. In yet another example, the period may be a function of the power consumption setting/mode that the UE is configured to use. For instance, if the UE is set to operate in a power saving mode due to battery limitations or any other reasons, the period may be relatively larger than for other power settings.

Figure 2:
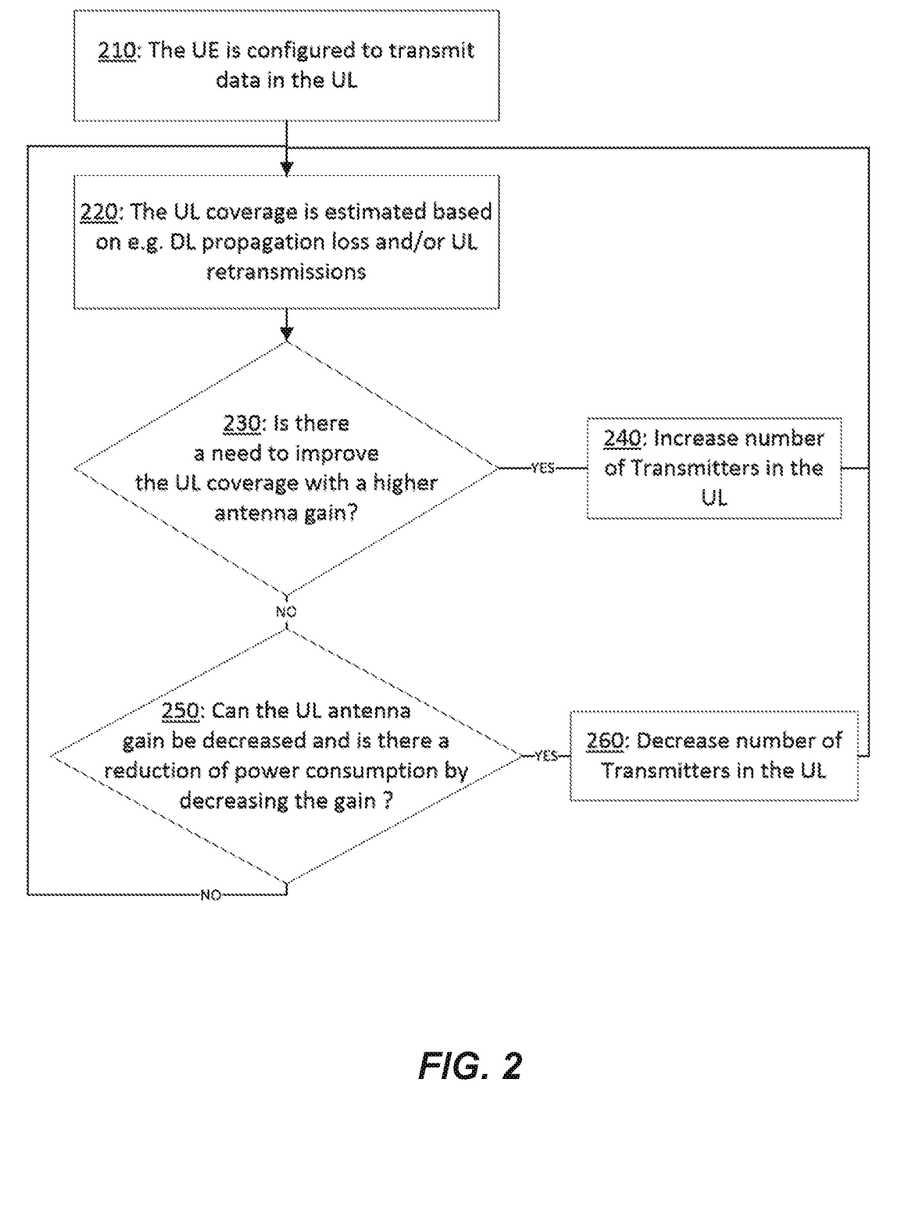
FIG. 2 is a process flow diagram illustrating an example process according to some embodiments of the presently disclosed techniques.

FIG. 2 is a process flow diagram illustrating an example process according to some embodiments of the presently disclosed techniques. This process is illustrated and described with respect to a UE, performing an uplink transmission. It will be understood, however, that a similar technique may be applied by other devices, for other types of wireless links, such as a downlink between a base station and a UE, or a peer-to-peer transmission from one UE to another. The same is true for the other techniques illustrated and described herein.

As shown at block 210, the UE is configured to transmit data in the uplink (UL). Then, for a given number of transmit antenna chains, it estimates the UL coverage and data rate, based on an estimate of the propagation loss from the UE to the receiving base station, or based on a count of retransmissions, or some combination of both. This is shown at block 220. Based on that, it makes an estimation of the possible performance gain/loss that would result in either increasing or decreasing the number of transmit chains in the UE. This is shown at blocks 230, 240, 250, and 260. As seen at blocks 230 and 240, if it is determined that there is a need to improve the uplink coverage, i.e., to increase the receive power at the target receiver due to an increased data rate that can be sent across the link and/or due to degraded propagation conditions, then the number of transmitters in the uplink is increased. It will be understood that this will generally require an increase in power consumption, but in this case the need for improved link performance may take priority. If there is not a need to increase the link performance, however, the UE evaluates whether the uplink antenna gain can be decreased, by reducing the number of transmit chains used to form the beamformed signal, such that there is an overall reduction in the total power consumption, even if the total transmit power is increased. This is shown at block 250. If yes, then the number of transmit chains in the uplink beamformer is reduced, as shown at block 260. Otherwise, there is no change.

In some embodiments, the procedure as described above is dynamically enabled in an UE-specific configuration step. In other words, the UE may receive, in some embodiments and/or instances, configuration information that activates or deactivates the evaluation and adjustments shown in FIG. 2, or some similar procedure. In some embodiments, this configuration may be done according to a system broadcast message. This configuration could be done, for example, according to the traffic situation in the network. For instance, the feature may be enabled at low traffic loads, when any potential increase of interference will not impact the network performance. In some embodiments, this configuration is done according to UE category, i.e., the feature is enabled for UEs for which battery life is important, but is disabled for high traffic, best effort, UEs. In some embodiments, some UE categories may be designed to always use the presently described techniques, without any configuration step.

Figure 3:
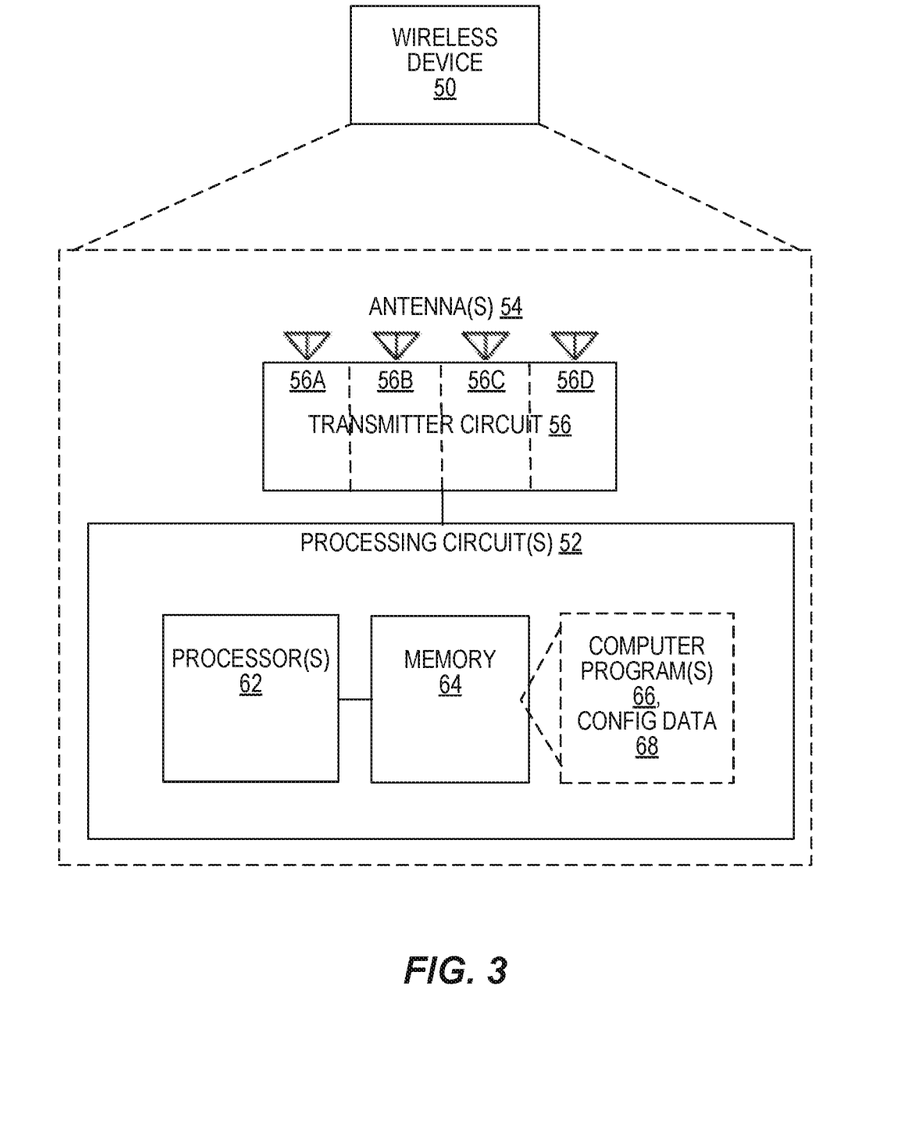
FIG. 3 is a block diagram of a wireless device, according to some embodiments.

FIG. 3 illustrates a diagram of a wireless device 50 that is configured to transmit signals to a target receiving device. The wireless device 50 may be considered to represent any wireless transmitter that may operate in a network, such as a UE in a cellular network. Some examples may include a communication device, target device, device to device (D2D) UE, machine type wireless device or wireless device capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc. Although the wireless device 50 may be a UE in various embodiments, this does not exclude the possibility that the wireless device 50 could represent a certain network node, or portion of a network node, that would utilize the techniques described herein.

The wireless device 50, in this example, is configured to communicate with a radio node or base station in a wide-area cellular network via a plurality of antennas 54 and a transmitter circuit 56. The transmitter circuit 56 may include amplifiers, converters, filters and any associated control circuits that are collectively configured to transmit signals according to a radio access technology, for the purposes of using cellular communication services. This radio access technology is a 5G radio access technology or the purposes of this discussion, but the wireless device may be adapted for other radio access technologies, in various embodiments. Typically, the wireless device 50 also includes receiver circuitry for receiving signaling. The antennas 54 may include antenna elements that together form an antenna aperture capable of beamforming operations.

The wireless device 50 also includes one or more processing circuits 52 that are operatively associated with the radio transceiver circuit 56. The processing circuit 52 comprises one or more digital processors 62, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50. The processing circuit 52 may be configured, e.g., through the use of appropriate program code stored in memory 64, to carry out one or more of the methods and/or signaling processes detailed hereinafter.

The transmitter circuit 56 may comprise a plurality of transmitter chains that drive the antenna aperture. These transmitter chains, which typically comprise a high-power amplifier and which may comprise other analog circuitry, such as filters, upconverting mixers, etc., are functionally represented by the divided portions 56A-56D of the transmitter circuit 56. These transmitter chains may be selectively used by processing circuit 52. That is, some transmitter chains are turned on or activated for a beamformed transmission while other transmitter chains are not turned on or activated for the beamformed transmission. This provides for the better management of transmission power resources.

In some instances of a digital approach, the processing circuit 52 performs the signal generation and baseband processing. These signals are fed to selected transmitter chains, which may include simple transmitter elements to drive the corresponding antennas among the antennas 54. In instances of an analog approach, the signal from the processing circuit 52 may pass through weights and phase shifters of certain transmitter chains before being amplified and transmitted through the corresponding antennas. Some analog components of transmitter chains were illustrated by FIG. 1.

The processing circuit 52 is configured, according to some embodiments, to determine a targeted receive power for the beam-formed signal, with respect to a target receiving device. The processing circuit 52 is also configured to select a number of the plurality of transmitter chains for forming the beam-formed signal, based on the targeted receive power and based on an estimated power consumption for each of the plurality of transmitter chains, where the selecting is performed so as to minimize a total power consumption, given the estimated power consumptions. The processing circuit 52 is also configured to transmit a beam-formed signal, using the selected number of the plurality of transmitter chains.

Figure 4:
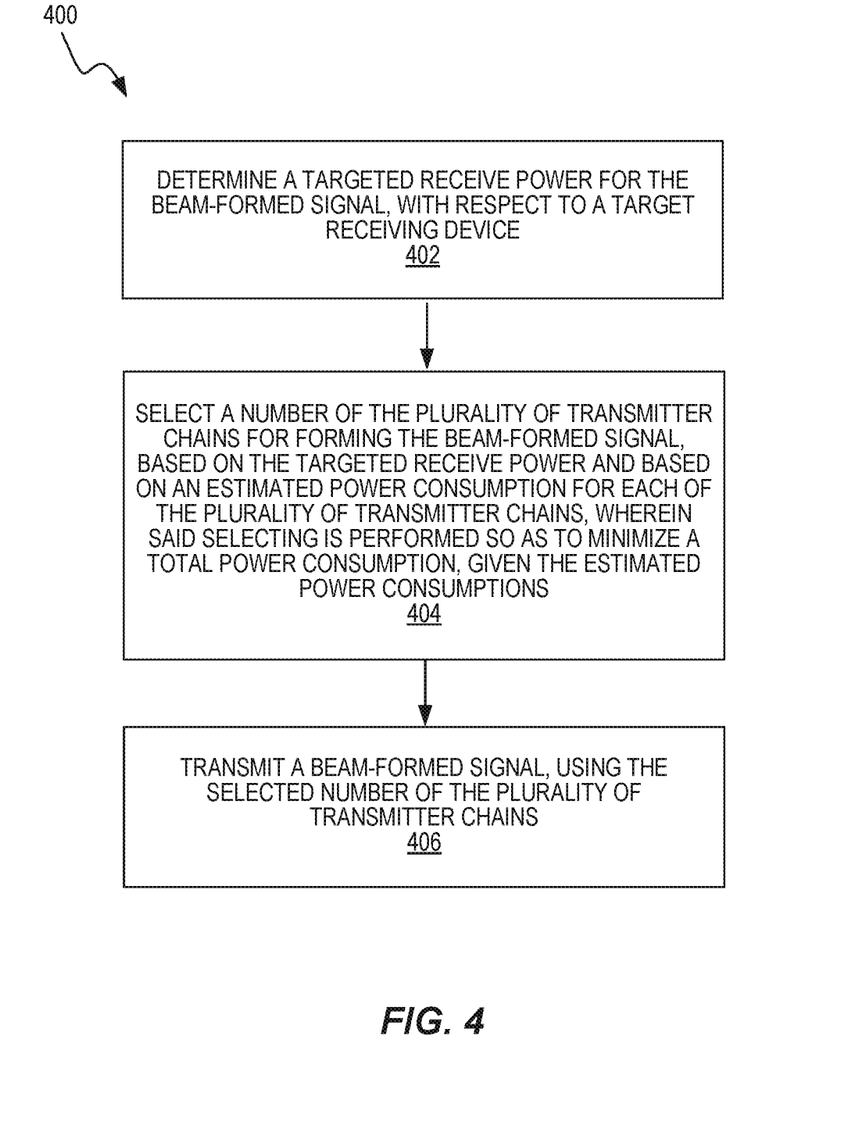
FIG. 4 illustrates a method in the wireless device, according to some embodiments.

According to some embodiments, the processing circuit 52 performs a method 400, shown in FIG. 4, that includes determining a targeted receive power for the beam-formed signal, with respect to a target receiving device (block 402). The method 400 also includes selecting a number of the plurality of transmitter chains for forming the beam-formed signal, based on the targeted receive power and based on an estimated power consumption for each of the plurality of transmitter chains, wherein said selecting is performed so as to minimize a total power consumption, given the estimated power consumptions (block 404). The method 400 further includes transmitting a beam-formed signal, using the selected number of the plurality of transmitter chains (block 406).

The method 400 may include determining the targeted receive power based on an estimated path loss between the wireless device and a targeted receiver. The receive power may be measured in the uplink since the uplink antenna beam in the wireless device is targeted. The wireless device is not able to measure this so the targeted receiver (e.g., eNodeB) may have to signal the received power. Therefore, the estimated path loss may be obtained from signaling received by the wireless device. The wireless device may receive, from the targeted receiver, the received power of an uplink signal and/or the transmission power of a downlink signal. In some cases, it may be easier to measure the received power of the downlink signal, which may be similar to that of the uplink signal. The received power of the downlink signal may be similar to, but not the same as, the received power of an uplink signal depending on the frequencies used or other factors. The determining of the targeted receive power may be further based on an estimated interference level and/or a targeted data rate for a transmission to the target receiving device.

In some embodiments, selecting the number of the plurality of transmitter chains includes determining, for at least one set of transmitter chains, a desired output power for each transmitter chain in the set, based on the targeted receive power and based on an estimated contribution of each transmitter chain to the targeted receive power. This determining may involve a calculation of the desired output power, based on the targeted receive power and based on the estimated contribution of each transmitter chain, or the use of a lookup table, where the targeted power and estimated contributions are input parameters, or some combination of both. The selecting also includes determining the estimated power consumption for each transmitter chain in the set, based on the desired output power for the respective transmitter chain. Again, this determining of the estimated power consumption may involve a calculation, a look-up table, or some combination of both. The estimated contribution may be an estimation for the power and the gain in the antenna lobe. This estimation may also be based on the estimated interference level. The method 400 may thus include determining the estimated contribution of each transmitter chain to the targeted receive power based on an estimated quality of channel information possessed by the wireless device.

The determining, selecting, and transmitting may be repeated one or more times. In some cases, the determining, selecting, and transmitting is repeated periodically. There may be an interval for repeating the determining, selecting, and transmitting. The interval may be based on an estimated speed and/or configured power mode for the wireless device.

The interval may also be based on estimated changes to the environment. For example, varying path loss or a more frequent need to adjust transmission power may indicate changes to an indoor or outdoor environment. The wireless device may also receive information about the environment or the locations of the wireless device and the target receiving device. In some embodiments, the interval may be decreased to increase the frequency that the determining, selecting and transmitting are to repeat, based on a detected change in environment.

The wireless device may be a UE in a wireless communications network, and the target receiving device may be a base station in the wireless communications network. The method 400 may further include receiving, from the wireless communications network, configuration information that activates an optimization mode according to which the determining, selecting and transmitting steps discussed above are carried out.

As discussed in detail above, the techniques described herein, e.g., as illustrated in the process flow diagram of FIGS. 2 and 4, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 5:
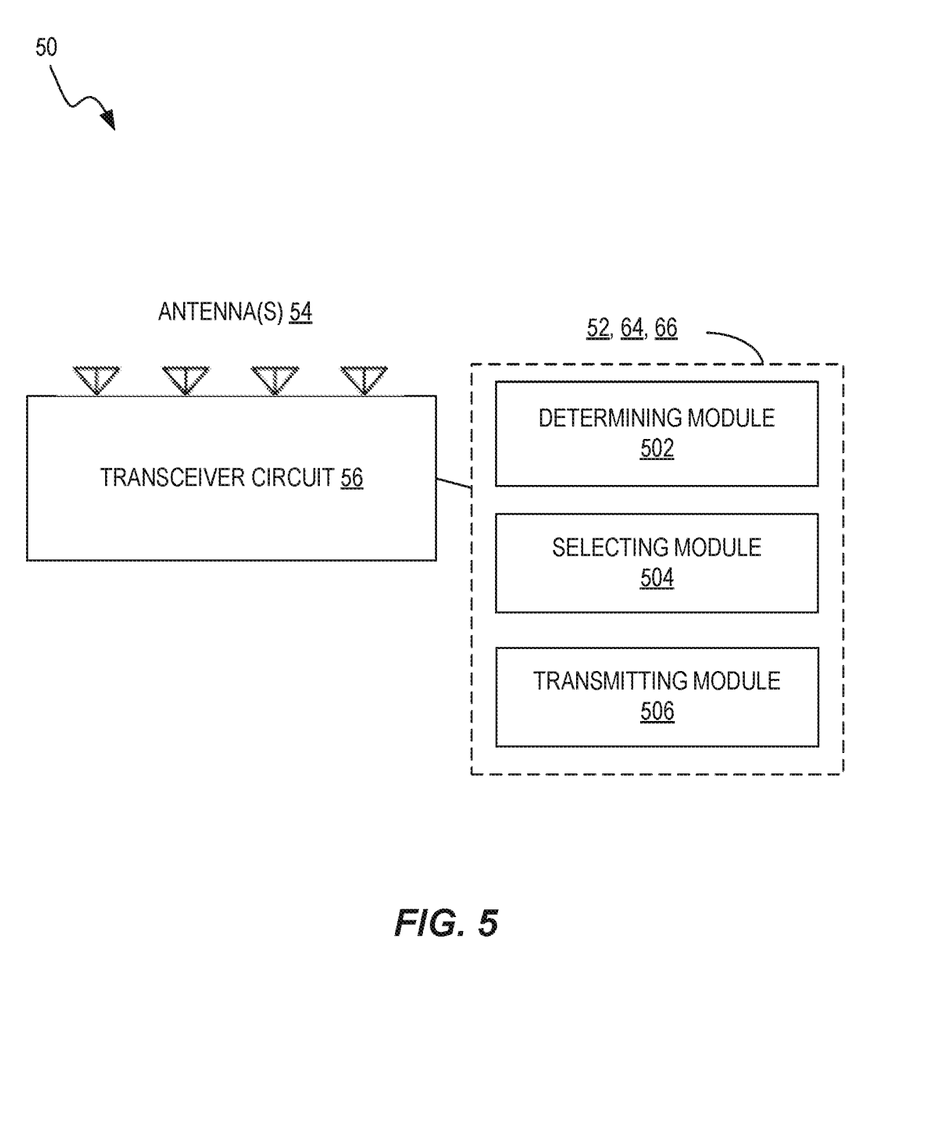
FIG. 5 is a block diagram illustrating a functional implementation of a wireless device, according to some embodiments.

For example, FIG. 5 illustrates an example functional module or circuit architecture as may be implemented in a wireless device 50 having a plurality of transmitter chains that can be selectively used to transmit a beam-formed signal. The implementation includes a determining module 502 for determining a targeted receive power for the beam-formed signal, with respect to a target receiving device. The implementation also includes a selecting module 504 for selecting a number of the plurality of transmitter chains for forming the beam-formed signal, based on the targeted receive power and based on an estimated power consumption for each of the plurality of transmitter chains, wherein said selecting is performed so as to minimize a total power consumption, given the estimated power consumptions. The implementation further includes a transmitting module 506 for transmitting a beam-formed signal, using the selected number of the plurality of transmitter chains.

The present invention may, of course, be carried out in other ways than those specifically set forth herein without departing from essential characteristics of the invention. The present embodiments are to be considered in all respects as illustrative and not restrictive.

What is claimed is:

1. A method, in a base station having a plurality of transmitter chains that can be selectively used to transmit a beam-formed signal, the method comprising:
   determining a targeted receive power for the beam-formed signal, with respect to a target user equipment (UE);
   selecting a number of the plurality of transmitter chains for forming the beam-formed signal, based on the targeted receive power and based on an estimated power consumption for each of the plurality of transmitter chains, wherein said selecting is performed so as to minimize a total power consumption, given the estimated power consumptions; and
   transmitting a beam-formed signal, using the selected number of the plurality of transmitter chains.

2. The method of claim 1, wherein determining the targeted receive power is based on an estimated path loss between the base station and the targeted UE.

3. The method of claim 2, wherein the estimated path loss is obtained from signaling received by the base station.

4. The method of claim 2, wherein determining the targeted receive power is further based on an estimated interference level.

5. The method of claim 2, wherein determining the targeted receive power is further based on a targeted data rate for a transmission to the target UE.

6. The method of claim 1, wherein selecting the number of the plurality of transmitter chains comprises:
   determining, for at least one set of transmitter chains, a desired output power for each transmitter chain in the set, based on the targeted receive power and based on an estimated contribution of each transmitter chain to the targeted receive power; and determining the estimated power consumption for each transmitter chain in the set, based on the desired output power for the respective transmitter chain.

7. The method of claim 6, further comprising determining the estimated contribution of each transmitter chain to the targeted receive power based on an estimated quality of channel information possessed by the base station.

8. The method of claim 1, wherein said determining, selecting, and transmitting are repeated one or more times.

9. The method of claim 8, wherein said determining, selecting, and transmitting are repeated periodically.

10. The method of claim 8, wherein an interval for repeating said determining, selecting, and transmitting is based on an estimated speed for the base station.

11. The method of claim 8, wherein an interval for repeating said determining, selecting, and transmitting is based on a configured power mode for the base station.

12. A base station, comprising:
a plurality of transmitter chains that can be selectively used to transmit a beam-formed signal; and
processing circuitry operatively associated with the plurality of transmitter chains and configured to:
determine a targeted receive power for the beam-formed signal, with respect to a target user equipment (UE);
select a number of the plurality of transmitter chains for forming the beam-formed signal, based on the targeted receive power and based on an estimated power consumption for each of the plurality of transmitter chains, wherein said selecting is performed so as to minimize a total power consumption, given the estimated power consumptions; and
transmit a beam-formed signal, using the selected number of the plurality of transmitter chains.

13. The base station of claim 12, wherein the processing circuitry is configured to determine the targeted receive power based on an estimated path loss between the base station and the targeted UE.

14. The base station of claim 13, wherein the estimated path loss is obtained from signaling received by the base station.

15. The base station of claim 13, wherein the processing circuitry is configured to determine the targeted receive power further based on an estimated interference level.

16. The base station of claim 13, wherein the processing circuitry is configured to determine the targeted receive power further based on a targeted data rate for a transmission to the target UE.

17. The base station of claim 12, wherein the processing circuitry is configured to select the number of the plurality of transmitter chains by:
determining, for at least one set of transmitter chains, a desired output power for each transmitter chain in the set, based on the targeted receive power and based on an estimated contribution of each transmitter chain to the targeted receive power; and
determining the estimated power consumption for each transmitter chain in the set, based on the desired output power for the respective transmitter chain.

18. The base station of claim 17, wherein the processing circuitry is configured to determine the estimated contribution of each transmitter chain to the targeted receive power based on an estimated quality of channel information possessed by the base station.

19. The base station of claim 12, wherein the processing circuitry is configured to repeat said determine, select, and transmit operations one or more times.

20. The base station of claim 19, wherein the processing circuitry is configured to repeat said determine, select, and transmit operations periodically.

21. The base station of claim 19, wherein the processing circuitry is configured to base an interval for repeating said determine, select, and transmit operations on an estimated speed for the base station.

22. The base station of claim 19, wherein the processing circuitry is configured to base an interval for repeating said determine, select, and transmit operations on a configured power mode for the base station.

23. A non-transitory computer readable storage medium storing a computer program comprising program instructions that, when executed on at least one processing circuit of base station having a plurality of transmitter chains that can be selectively used to transmit a beam-formed signal, configures the base station to:
determine a targeted receive power for the beam-formed signal, with respect to a target user equipment (UE);
select a number of the plurality of transmitter chains for forming the beam-formed signal, based on the targeted receive power and based on an estimated power consumption for each of the plurality of transmitter chains, wherein said selecting is performed so as to minimize a total power consumption, given the estimated power consumptions; and
transmit a beam-formed signal, using the selected number of the plurality of transmitter chains.

* * * * *